Patented May 3, 1927.

1,627,356

UNITED STATES PATENT OFFICE.

HEBER F. TOWNER, OF SANTA ANA, CALIFORNIA.

DISK CULTIVATOR.

Application filed June 29, 1926. Serial No. 119,362.

This invention relates to disk cultivators and is more particularly directed to a disk cultivator, including a pair of gangs of disks connected in tandem relation, the front gang being connected to a tractor or similar source of draft power, and which front gang is connected to a rear gang by a single draft and working connection so positioned as to close the latter gang to automatically assume a position in which the working angle of the disks is substantially the same as the working angle of the disks of the rear gang.

This application is a continuation or substitute for that application heretofore filed by me, Serial No. 7,868, filed February 9, 1925, for disk harrow.

A single gang of disks of concave convex structure cannot be used for cultivating the ground if all of the disks are mounted in the gang with their concave sides turned toward one end of the gang because the throw of the ground against the concave side of the disks would cause the gang of disks to travel in a sidewise direction. For this reason, cultivators are always provided with a plurality of gangs of disks, the disks of the separate gangs being mounted with their concaved sides opposed so that the throw of one gang of disks, or one set of gangs of disks, will compensate for the throw of the other oppositely mounted gang or set of gangs.

In cultivating among trees and vegetation, it is often desirable to pull the disk cultivator close to the trees or other cultivation while the tractor remains spaced from or in a lane centrally between the trees, or the like. Heretofore, with disk cultivators as heretofore designed and built, such offset or side operation has been impossible without exerting a great side draft on the tractor or other draft implement, which side draft has made it impossible in most cases to properly handle the tractor, made turns difficult or impossible, and greatly increased the wear on the bearings of the cultivator as well as on the tractor. Because of these difficulties, such offset manner of cultivating has previously been highly impractical if not impossible.

It is an object of this invention to provide a disk cultivator having two gangs of oppositely disposed disks, one of which gangs is positioned ahead of the other and which gangs of disks are connected by a single draft or working connection.

Another object of this invention is to provide a disk cultivator in which the single draft or working connection between the forward and rearward gangs is positioned from the center substantially to one end of the respective gangs.

Another object of this invention is to provide a disk cultivator composed of a pair of gangs of disks, one forward and one rearward gang, of which the forward gang only is directly connected to the tractor, and which gangs are so connected together in working relation at a single point that on variation of the connection from the forward gang to the tractor to adjust the working angle of the forward gang, the forward gang will automatically assume a similar working position.

Another object of this invention is to provide a disk cultivator having a pair of gangs of disks so connected together at a single working and draft connection, that the same may be drawn to one side of the tractor or like source of draft power without imposing upon the tractor or like source of draft power any material side draft in order that the disk cultivators may be operated under trees or close to fences, vegetation, ditches, or the like, without necessitating the driving of the tractor or like source of draft power under trees or close to ditches, fences, vegetation, etc.

Another object of this invention is to provide a disk cultivator having a pair of gangs of disks connected in tandem relation and so connected together that the same may be drawn to the extreme side of a tractor without imposing upon the tractor any material side draft which would prevent the free manipulation, turning, or the like, of the tractor.

Another object of this invention is to provide a disk cultivator having a plurality of gangs, in which cultivator the disks of one gang are positively offset from the disks of the other so that the disks of the respective gangs will cultivate independent rows or furrows in the ground.

Another object of this invention is to provide a disk cultivator having a plurality of gangs of disks, in which the disks of one gang are positively offset from the disks of the other gang, and which positive offset of the disks of one gang may be varied or regulated in relation to the disks of the other gang to accommodate for desired conditions of cultivation so that the disks will at all times cultivate independent rows or furrows in the ground.

Another object of this invention is to provide a rigid connection between the connections of disks so that the disks will positively follow the line of cultivation for which they are set.

Another object of this invention is to provide a disk cultivator having a plurality of gangs of disks connected in tandem relation by means of a coupling vertically rigid, so that the rear gang will cultivate as much ground as the forward gang and so that the cultivator will operate to level the ground, and so that the weight of one gang aids the other in cultivating the ground.

Another object of this invention is to provide a disk cultivator having a forward gang of disks and a rearward gang of disks, and which gangs of disks are connected by a single working and draft connection, and in which cultivator the disks in the rearward gang are mounted to throw the soil toward the single and working draft connection and the disks of the forward gang are mounted to throw the soil away from the single working or draft connection.

Other objects and advantages of this invention will be apparent from the following detailed description of a preferred embodiment thereof as illustrated in the accompanying drawings, in which drawings.

I have discovered that by connecting a pair of gangs of disks, one of which is positioned in advance of the other at a pivot point approximately centrally located between the axes of the disks of the respective gangs and at a point at or beyond the ends or end disks of the respective gangs, that I am enabled to provide a disk harrow which can be drawn from the side of a tractor without imposing any material side draft upon the said tractor and that in this position the cultivator may be drawn under trees close to the trunks thereof or close to vegetation, ditches, fences or the like, while the tractor may be maintained spaced or away from the said trees, vegetation, fences, ditches or the like, and that when so connected, the tractor may be freely manipulated and the tractor and its assembly may be freely turned without imposing undue strains upon the cultivator or the tractor.

Figure 1:
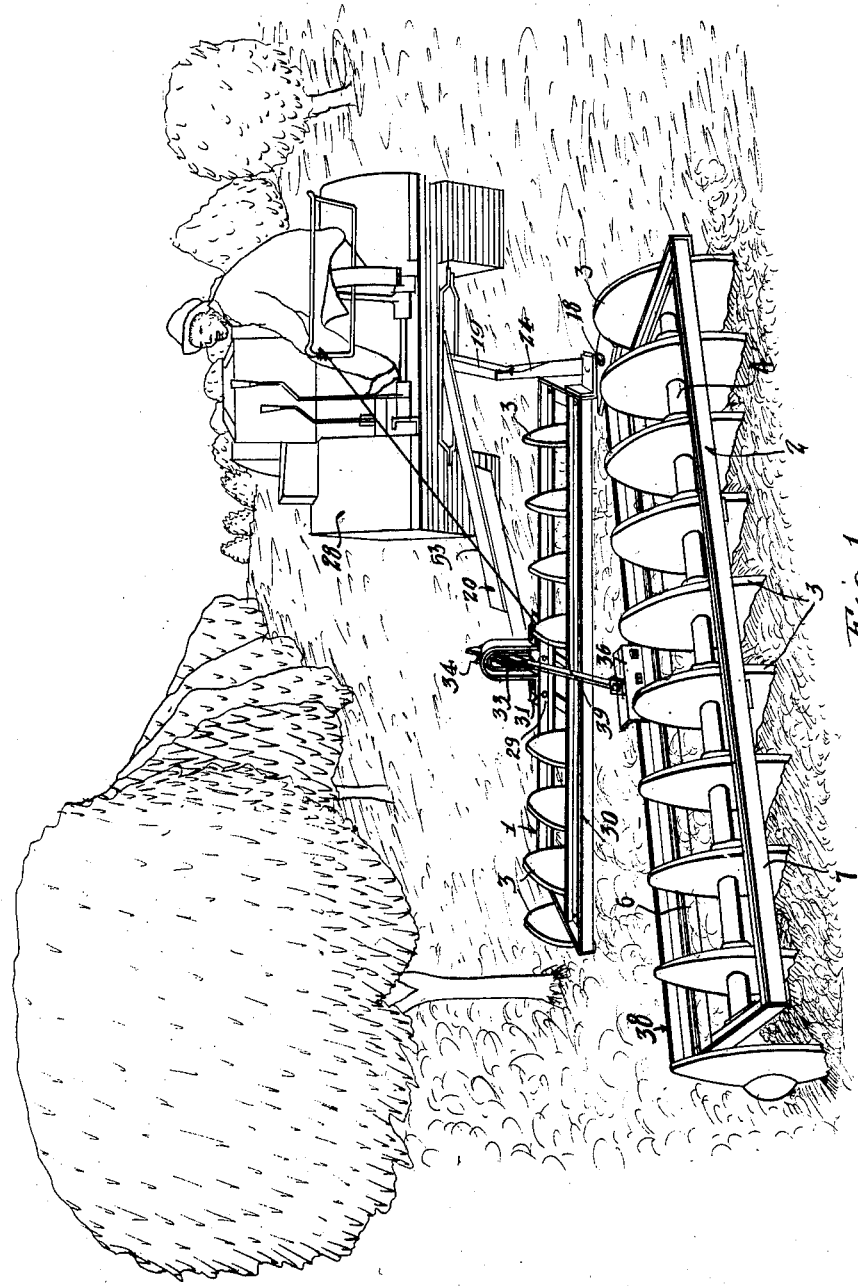
Figure 1 is an isometric view illustrating a disk harrow embodied in this invention, and illustrating the same as connected with a tractor and as offset from the line of travel of the tractor to cultivate under a row of trees.
Figure 2:
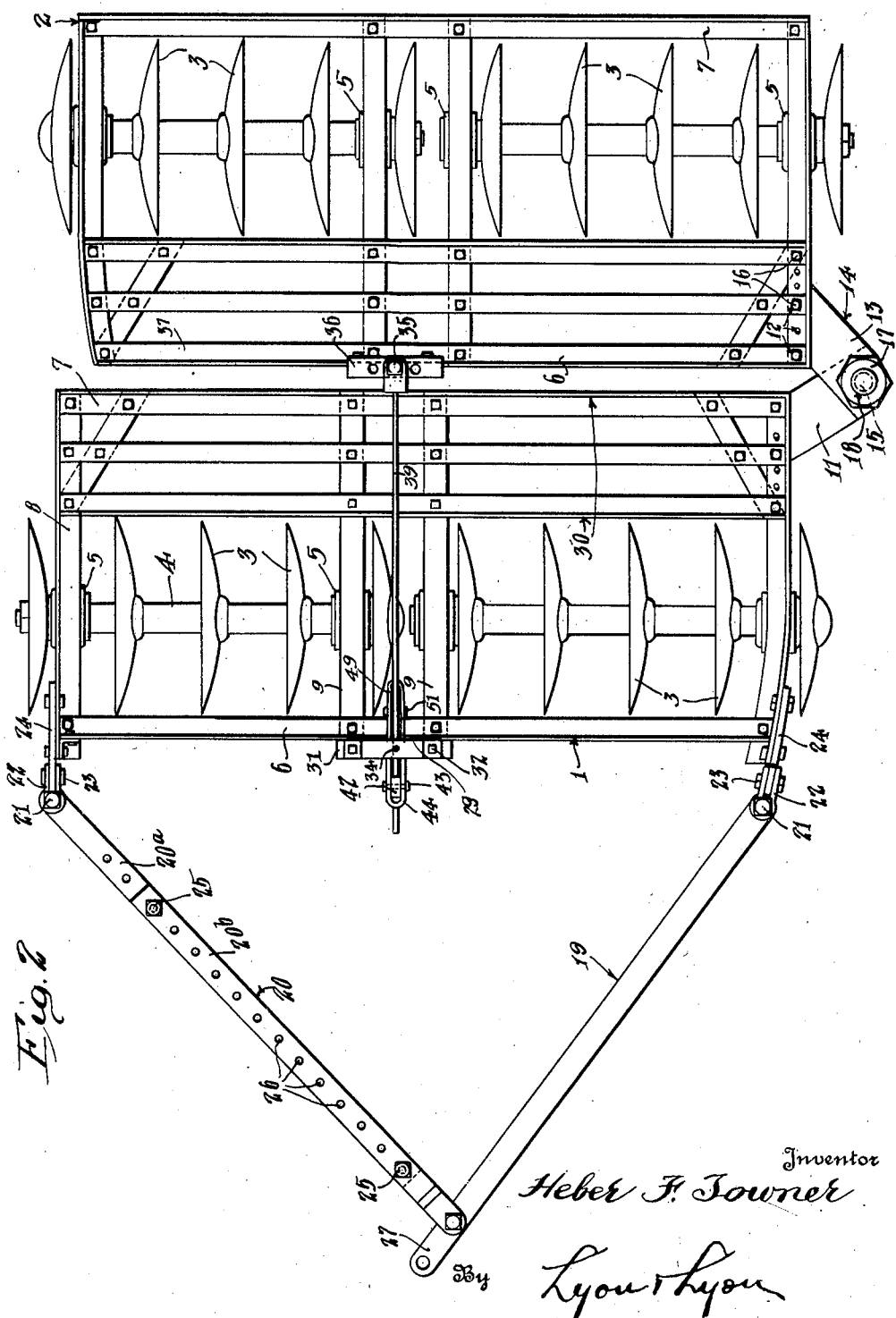
Figure 2 is a top plan view thereof.
Figure 3:
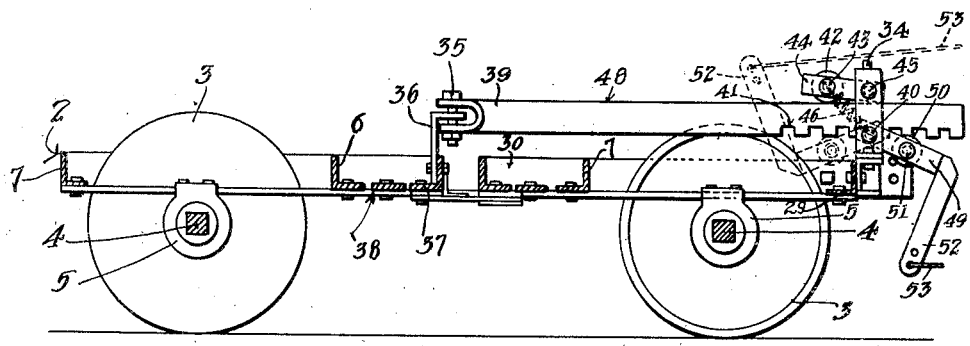
Figure 3 is an edge elevation partly in vertical mid-section.

In the preferred embodiment of this invention, illustrated in the accompanying drawings, 1 illustrates a forward frame and 2 illustrates a rearward frame, in which frames 1 and 2 a plurality of disks 3 are mounted on shafts 4, which shafts 4 are journaled in a plurality of bearings 5 secured to the frame in any suitable manner. The frames 1 and 2 comprise forward bars 6 and rearward bars 7 held in spaced relation by means of a plurality of end members 8 and intermediate braces 9. Weight boxes formed of channel iron or any suitable construction are mounted upon the member 7 of the forward gang, and the member 6 of the rearward gang and are adapted to receive weights so as to hold the disks in working engagement with the ground. Means are provided for connecting the frame 1 and frame 2 so that the harrow formed thereby may be connected to and drawn from a tractor in an offside position, as illustrated in Figure 1, without imposing upon the tractor any material side draft, which means are preferably of the following construction:

Secured to one end of the bar 7 of the frame 1 is a plate 11, which plate 11 extends beyond the end of the bar 7 and the end of the outer disk 3 and is secured within a bifurcated bracket 14, which bifurcated bracket 14 is secured to the corresponding end of the bar 6 by means of bolts 16, which bolts 16 are adapted to pass through the bores 12 formed in the members 6, which bores 12 are spaced along the ends of the members 6 so as to permit a regulation of the position of the bifurcated bracket 14 so that the spacing of the disk 3 of the rearward frame 2 may be regulated in relation to the position of the disks 3 of the forward frame 1. This regulation of the position of the disks permits the disks 3 to be positioned to follow certain furrow lines, depending upon the condition of the soil and cultivation desired and so as to maintain the disks of the rear gang from following in the furrow formed by the disks 3 of the forward gang.

The bifurcated bracket 14 is illustrated as being formed of a pair of bars 13. The plate 11 is secured to the bifurcated bracket 14 at the pin 15 so that the frames 1 and 2 pivot in a horizontal plane but are vertically rigidly connected. The pin 15 is held in place by means of nuts 17 and a grease cup 18 is secured to the pin 15 for lubricating this pivotal connection.

Means are provided for adjustably connecting the forward frame 1 to the tractor or other source of draft power so as to permit regulation of the cutting position and angle of cutting of the disks 3 and the offset position of the disk harrow relative to the tractor, which means may comprise bars 19 and 20 which are pivotally connected at pins 21 to links 22, which links 22 are pivotally connected at pins 23 to plates 24 which are secured to the forward outer edges of the frame 1. The bar 20 is formed of two sections, 20ª and 20ᵇ, which are adjustably connected together by means of bolts 25 which are passed through any pair of a series of holes 26 formed in the sections 20ª and 20ᵇ, respectively, so as to regulate the length thereof. The regulation of the length or extent of the bar 20 regulates the point at which the clevis 27, which is formed at the end of the blade 19, is secured to the draft pin of the tractor 28 so as to regulate the position or line of draft from the tractor relative to the disk harrow, thereby regulating the amount of offset or side position relative to the tractor in which the disk harrow is operated.

I have discovered that under normal operation the rear frame 2 will assume the same angle with the line of progression of the harrow that is assumed or adjusted to the front frame and that the interior of this working of the rear frame 2 is entirely through the pin 15 and the location thereof, and further that the further out from the ends of the disk gangs that the pivot formed by the pin 15 is located the more perfect will be the control of the working of the disks.

It is also essential that the disks 3 of the rear gang be mounted with their concave sides turned toward the pin 15 and that the disks 3 of the forward gang be mounted with their concave sides away from the pin 15. With this arrangement of parts, the side-thrust of the ground against the concave sides of the disks produces a torque at the pin 15 which maintains the gangs of disks in their proper working relation without the use of auxiliary holding devices.

In order to permit the backing of the disk harrow, and in order to permit the regulation of the angle of the disks after the same have been locked together so as to permit the backing thereof, I have herein illustrated a preferred form of back-up attachment which is of the following construction:

Mounted on the forward frame member 29 of the forward frame 1 is a bracket 31, which bracket 31 is secured to the frame member 29 in any suitable way, such as is illustrated at 32. A bifurcated bracket 33 is pivotally supported between the bracket 31 and the frame member 29 by means of pins 34 which extend from the opposite ends of the bifurcated bracket 33. Pivotally secured at a pin 35 which is secured to the plate 36 and which is secured to the forward frame member 37 of the hold-down frame 38 of the rear frame 2, is a back-up bar 39, which back-up bar 39 extends through the bifurcated bracket 33. A latch pin 40 is mounted in the bifurcated bracket 30 in position to engage any one of a plurality of notches 41 formed in the back-up bar 39 so as to lock the rear frame 2 relative to the forward frame 1 when it is desired to back the implement.

Means are provided for holding the back-up bar 39 down so that the pin 40 will be engaged in the proper notch 41 formed therein, which means preferably comprise a roller 42 which is pivotally mounted on a pin 43 in a yoke 44 which is pivotally secured to the bifurcated bracket at a pin 45.

A tension spring 46 is secured at one end to the yoke 44 and at its opposite end to the pin 40 which is secured to the bifurcated bracket 33, the spring 46 acting to yieldably urge the roller 42 in engagement with the upper edge 48 of the hold-down bar 39 so as to hold the bar 39 down against the pin 40.

Means are provided for releasing the back-up bar 39 from the pin 40 when it is desired to angle the respective gangs of the disks after the same have been transported to the desired point of use, which means preferably comprise a yoke 49 which is pivotally secured to the bifurcated bracket at the pin 40 and which carries a roller 50 journaled on a pin 51 in the yoke 49 and which yoke 49 has a right angle extending bar 52 which extends downwardly therefrom to a point below the frames 1 and 2 of the respective gangs and is secured at its lower end to a flexible actuating member 53, which flexible actuating member may be a rope, cable or the like as desired and which extends from the disk harrow to the point near the driver's seat of the tractor 28.

Figures 4, 5:
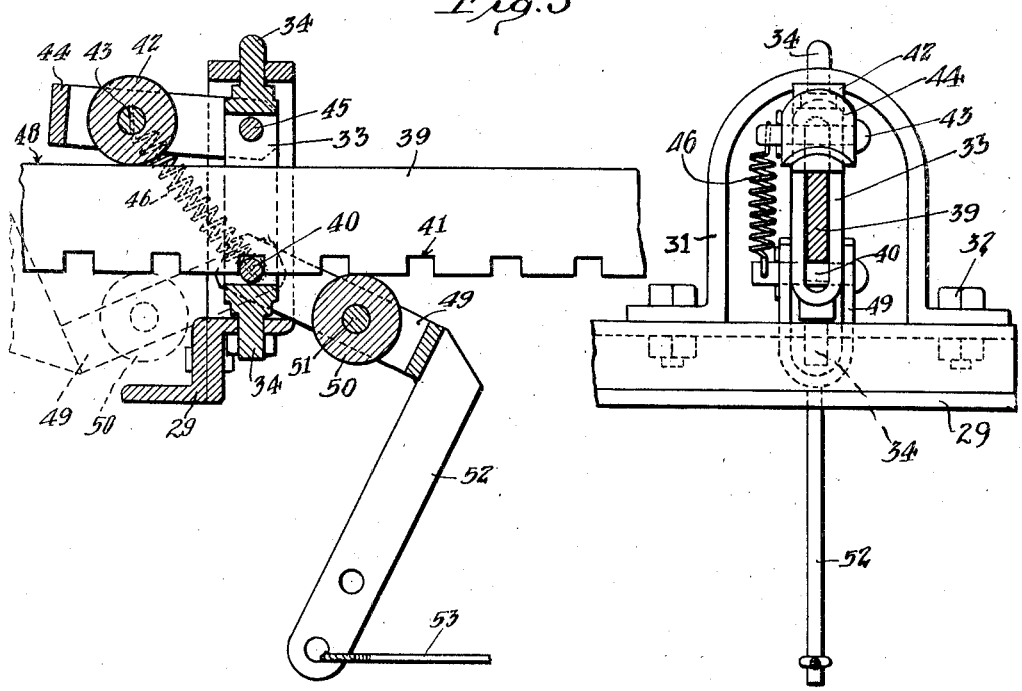
Figure 4 is a fragmental sectional side elevation on an enlarged scale of a back-up attachment embodied in this invention.
Figure 5 is a front elevation of the back-up attachment illustrated in Figure 4.

The actuating mechanism provided by the arm 52, yoke 49 and roller 50 are so constructed that the same may be reversed on the pin 40, either as illustrated in full or dotted lines in Figure 4. The reversible feature, therefore, is particularly desirable as when cultivating under orange trees, the arm 52 must extend downward to avoid the branches of the trees, and when cultivating plants, such as cantaloups, the arm 52 must extend upward to avoid catching in the plants.

In order to decrease wear on the bearings 5 within which the shafts 4 are journaled, to which the disks 3 are secured, particularly upon turning of the disk harrow, and in order to render the manipulation of the disk harrow easier upon turns and the like, I have discovered that it is advantageous to form the shafts 4 of each of the gangs of the disk harrow in two sections 4ª and 4ᵇ so that on turning of the disk harrow, that is, outer from the point of turning, it will not be required to rotate at the same speed as the disk 3 upon the inner side of the disk harrow, but will be permitted to rotate at the speed required to consummate such a turn. This eliminates the necessity of the disks of one section of the shaft turning during the making of a curve at the same rate of speed as the disks upon the other section of the shafts and thereby eliminates the tendency of the disks carried in the respective gangs from "digging in" during the turning of the disk harrow and insures more easy and efficient operation of the gangs of the disks harrow and greatly lengthens the life thereof.

Disk harrows, as now commonly constructed, are provided with front and rear weight frames to receive weights to hold the same in engagement with the ground. These hold-down frames are, in the disk harrow as now commonly in use, formed at the rear of the respective frames. I have discovered that more efficient operation is had if the hold-down frame 38 of the rear frame 2 is formed at the forward end thereof so that the disks 3 of this gang are held down upon their forward ends rather than upon their rearward ends. This being due particularly to the tendency of a disk harrow which is drawn from the forward end in tilting upward at that end and so that the positioning of the load at the rear thereof would only accentuate this tilting action while the limiting of the load at the forward end operates the tilting tendency created by the draft of the frame at the forward end and insures a much more even and better operation. The hold-down frame 30 of the forward frame 1 is preferably formed at the rear thereof.

Having fully described a preferred embodiment of my invention, it is to be understood that I do not wish to be limited to the exact details herein set forth, which may obviously be varied without departing from the spirit of my invention as set forth in the appended claims.

I claim:

1. In a single tandem disk harrow, the combination of a forward gang of disks, a rearward gang of disks, means for pivotally connecting the rear gang of disks to the forward gang of disks at one end, the pivot point being located at a point substantially midway between the disk shafts mounted in the respective frames, and at a point beyond the ends of the end disks carried by the respective shafts when the frames are parallel.

2. In a single tandem disk harrow, the combination of a forward gang of disks, a rearward gang of disks, means for pivotally connecting the front and rear gangs of disks at one end thereof at a point beyond the ends of said gangs when the gangs are parallel.

3. In a single tandem disk harrow, the combination of a front gang of disks, a rear gang of disks, means pivotally connecting the front and rear gangs of disks at one end of the said gangs and at a point substantially midway between the said gangs.

4. In a single tandem disk harrow, the combination of a front gang of disks, a rear gang of disks, the disks of the forward gang being concaved in one direction, the disks of the rearward gang being concaved in the opposite direction, means for pivotally connecting the front and rear gangs at a point beyond the center of the end disks of the said gangs when the said gangs are parallel at the end of the said gangs of disks toward which the disks carried by the rear gang are concaved.

5. In a single tandem disk harrow, the combination of a front gang of disks, a rear gang of disks, the disks of the forward gang being concaved in a direction opposite from the disks of the rear gang, means for pivotally connecting the front and rear gangs, at a point beyond the center of the end disks of the said gangs when the said gangs are parallel, said means comprising a vertically rigid hinge, the pivot point of which is beyond the ends of the disks at one end of the gangs when the gangs are parallel.

6. In a single tandem disk harrow, the combination of a front gang of disks, and a rear gang of disks, means for pivotally connecting the front and rear gangs of disks at a point beyond the center of the end disks at one end of the gangs when the gangs are parallel.

7. In a single tandem disk harrow, the combination of a front gang of concaved disks, a rear gang of concaved disks, means for connecting the gangs of disks together at one end at a single pivot, which pivot is located substantially on the bisector of the angle between the axes of the disks of the said gangs and near the end of the said gangs, the disks of the rear gang being concaved toward the pivot point and the disks of the forward gang being concaved away from the pivot point.

8. In a single tandem disk harrow, the combination of a front gang of concaved disks, a rear gang of concaved disks, means for horizontally pivotally connecting the gang of disks together at a single pivot so that the gangs are substantially vertically rigidly connected, the said pivot being located substantially on the bisector of the angle between the axes of the said gangs when the gangs are angled at a point near one end of the said gangs, the disks of the rear gang being concaved toward the pivot of the disks and the forward gangs being concaved away from the pivot.

9. In a single tandem disk harrow, the combination of a forward frame, a gang of concaved disks mounted within the frame, a rear frame, a gang of concaved disks mounted within the rear frame, means for pivotally connecting the said frames at a horizontal pivot, said pivot being located substantially on the bisector of the angles between the axes of the said gangs when the same are angled, the disks of the rear frame being mounted within the said frame with their concaved sides turned toward the said pivot and the disks of the rearward gang being mounted with their concaved sides away from the said pivot.

10. In a single tandem disk harrow, the combination of a front frame and a rear frame, means for vertically rigidly connecting the said frames at one end at a horizontal pivot located substantially midway between the axes of the disks carried by the said frames, means for connecting the front frame to a draft implement, and means for varying the draft connection so as to cause the implement to be drawn to one side and to the rear of the draft implement and so as to cause the forward frame to be angled relative to the line of draft of the implement, whereby the rearward frame will assume a complementary working angle.

11. In a single tandem disk harrow, the combination of a front frame, a rear frame, a plurality of concaved disks mounted in each frame, means for vertically rigidly connecting the said frames together at a horizontal pivot, and means including a plate secured to one corner of one of said frames and adapted to fit within a bifurcated bracket secured to the corresponding adjacent corner of the other of said frames, and a pin passing through said bifurcated bracket and plate to pivotally connect the said frames together, the said pin being located substantially midway between the axes of the disks carried by the said frame and at a point beyond the ends of the said frames when the same are parallel.

12. In a tandem disk harrow, the combination of a front frame, a rear frame, a plurality of concaved disks mounted in each frame, means for vertically rigidly connecting the said frames together at a horizontal pivot, said means including a plate adjustably secured to the end section of one of said frames, a bifurcated bracket secured to the adjacent end section of the opposite of the said frames, and a pin pivotally secured at said plate within the said bracket.

13. In a single tandem disk harrow, the combination of a front frame, a rear frame, a gang of disks mounted within each frame, means for vertically rigidly connecting the said frame at their ends at a horizontal pivot pin, said means including a plate secured to one end section of one of said frames, a bifurcated bracket secured to the other of said frames into which the said plate fits, and a pivot pin passing through said plate and said bracket, said pivot pin being located substantially on the bisector of the angle formed between the axes or gangs of disks when the same are angled to a working position and said pin being near the end of the said gang.

14. In a single tandem disk harrow, the combination of a forward gang of disks, a rearward gang of disks, means for pivotally connecting the front and rear gangs of disks at one end thereof and at a point beyond the ends of the said gangs when the gangs are parallel and at a point substantially midway between the said gangs, adjustable driving connections secured to the forward gangs of disks and comprising a pair of draft bars, and means for adjusting the length of one of said draft bars.

15. A harrow comprising two gangs only in tandem relation, means for pivotally connecting the said gangs together at one end at a single pivot, and a stay and back-up bar pivotally connected between the said gangs between the ends thereof.

16. A disk harrow comprising two gangs only in tandem relation pivotally connected together at a single draft connection, a stay and back-up bar pivotally connected to each of said gangs between the ends thereof, and means for releasing the stay and back-up bar connection to one of said gangs.

17. A disk harrow comprising two gangs only in tandem relation, a draft connection between the forward gang, and the rearward gang, and a stay and back-up bar pivotally connected to each of said gangs between the ends thereof.

18. A harrow comprising two gangs only in tandem relation, means for pivotally connecting the said gangs together at one end at a single pivot, a stay and back-up bar, means for pivotally connecting the back-up bar to the rear gang at a point between the ends thereof, and means for adjustably securing the bar to the forward gang at a point between the ends thereof.

19. A harrow comprising two gangs only in tandem relation, means for pivotally connecting the said gangs together at one end at a single pivot point, a stay and back-up bar, means for pivotally connecting the back-up bar to the rear gang, means for pivotally securing the bar to the front gang, and means for releasing the latter securing means.

20. A harrow comprising two gangs only in tandem relation, means for pivotally connecting the gangs together at one end at a single pivot, a stay and back-up bar, means for pivotally securing the back-up bar to the rear gang, and means for slidably and pivotally securing the back-up bar to the front gang.

21. A harrow comprising two gangs only in tandem relation, means for pivotally connecting the gangs together at one end at a pivot, a stay and back-up bar, means for pivotally connecting the back-up bar to the rear gang, a bracket secured to the forward gang, a bifurcated bracket pivotally supported in the bracket, and means for adjustably securing the back-up bar within the bifurcated bracket.

22. A harrow comprising two gangs only in tandem relation, means for pivotally connecting the gangs together at one end at a pivot, a stay and back-up bar, means for connecting the back-up bar to the rear gang between the ends thereof, and bracket secured to the forward gang, a bifurcated bracket pivotally supported by the forward gang, and within which the back-up bar is slidably mounted, a control lever pivotally supported by the bracket, and catch means between the control lever and back-up bar for holding the gangs in non-working position to permit backing thereof.

23. A harrow comprising two gangs only in tandem relation, means for pivotally connecting the gangs together at one end at a pivot, a stay and back-up bar, means for pivotally connecting the bar to the rear gang, means for pivotally supporting the other end of the bar on the front gang between the ends thereof, and adjustable limit stop means carried by the bar.

24. A harrow comprising two gangs only in tandem relation, means for pivotally connecting the gangs together at a pivot, a stay and back-up bar, means for pivotally connecting the bar to the rear gang, means for releasably and pivotally securing the bar to the front gang, said means including a control lever, latch means between the control lever and the back-up bar, and a flexible connecting member secured to the control lever and extending forward from the harrow.

Signed at Los Angeles, Calif., this 21 day of June, 1923.

HEBER F. TOWNER.

DISCLAIMER 1,627,356.—*Heber F. Towner*, Santa Ana, Calif. DISK CULTIVATOR. Patent dated May 3, 1927. Disclaimer filed February 1, 1938, by the assignees, *Howard B. Rapp* and *Truman C. Rapp; Sally Rapp*, guardian of said *Truman C. Rapp*.
Hereby disclaim claim 17 of said patent.
[*Official Gazette February 22, 1938.*]